US012050793B2

(12) United States Patent
Lu

(10) Patent No.: US 12,050,793 B2
(45) Date of Patent: Jul. 30, 2024

(54) CLOUD SYSTEM FOR INDIVIDUAL PERIPHERAL DEVICE

(71) Applicant: DEXIN CORP., New Taipei (TW)

(72) Inventor: Ho Lung Lu, New Taipei (TW)

(73) Assignee: DEXIN CORP., New Taipei (TW)

( * ) Notice: Subject to any disclaimer, the term of this patent is extended or adjusted under 35 U.S.C. 154(b) by 15 days.

(21) Appl. No.: 18/085,834

(22) Filed: Dec. 21, 2022

(65) Prior Publication Data

US 2023/0118603 A1 Apr. 20, 2023

Related U.S. Application Data

(63) Continuation-in-part of application No. 17/737,856, filed on May 5, 2022, now Pat. No. 11,599,137.

(60) Provisional application No. 63/184,553, filed on May 5, 2021.

(30) Foreign Application Priority Data

Dec. 22, 2021 (TW) ................................ 110148204
Dec. 30, 2021 (TW) ................................ 110149663

(51) Int. Cl.
*G06F 3/033* (2013.01)
*G06F 3/06* (2006.01)

(52) U.S. Cl.
CPC .......... *G06F 3/0635* (2013.01); *G06F 3/0607* (2013.01); *G06F 3/067* (2013.01)

(58) Field of Classification Search
CPC .......... G06F 1/169; G06F 3/016; G06F 3/033; G06F 3/0338; G06F 3/0346; G06F 3/038; G06F 3/0607; G06F 3/0635; G06F 3/067; A63F 13/22; A63F 13/24; A63F 13/355; A63F 2300/1018
See application file for complete search history.

(56) References Cited

U.S. PATENT DOCUMENTS

| 6,078,311 A | * | 6/2000 | Pelkey | ................ | G06F 3/0383 |
| | | | | | 345/161 |
| 6,511,378 B1 | * | 1/2003 | Bhatt | ................ | A63F 13/843 |
| | | | | | 463/36 |
| 6,580,418 B1 | * | 6/2003 | Grome | ................ | A63F 13/22 |
| | | | | | 345/161 |

(Continued)

*Primary Examiner* — Joe H Cheng
(74) *Attorney, Agent, or Firm* — Maschoff Brennan

(57) ABSTRACT

A cloud system includes: an individual peripheral device including a microcontroller and a memory electrically connected to the microcontroller, wherein the microcontroller collects input-output data of the individual peripheral device, and the memory stores product data, user data of the individual peripheral device and the input-output data; a local host device electrically connected to the individual peripheral device, configured to receive the product data, the user data and the input-output data, wherein the local host device collects environment data of the individual peripheral device; and a cloud unit communicatively connected to the local host device, configured to receive the product data, the user data, the input-output data and the environment data and status data of the local host device, and output an effective parameter according to the input-output data, the environment data and the status data, wherein the effective parameter is for correcting the input-output data.

20 Claims, 5 Drawing Sheets

(56) References Cited

U.S. PATENT DOCUMENTS

| | | | |
|---|---|---|---|
| 8,893,013 B1* | 11/2014 | Groves | G06F 3/1454 |
| | | | 715/740 |
| 9,535,857 B2* | 1/2017 | Dabbiere | G07G 1/0045 |
| 10,775,909 B2* | 9/2020 | Lu | G06F 3/038 |
| 11,599,137 B2* | 3/2023 | Lu | A63F 13/22 |
| 11,657,190 B2* | 5/2023 | Harrison | G06F 3/011 |
| | | | 345/426 |
| 2005/0255915 A1* | 11/2005 | Riggs | A63F 13/24 |
| | | | 463/37 |
| 2011/0105231 A1* | 5/2011 | Ambinder | A63F 13/24 |
| | | | 463/38 |
| 2013/0100021 A1* | 4/2013 | Larsen | A63F 13/214 |
| | | | 345/161 |
| 2018/0104574 A1* | 4/2018 | Tager | A63F 13/20 |
| 2019/0104384 A1* | 4/2019 | Abou-Rizk | G01S 1/0426 |
| 2019/0126140 A1* | 5/2019 | Nelson | A63F 13/22 |
| 2020/0164269 A1* | 5/2020 | Palmer | A63F 13/22 |

* cited by examiner

CLOUD SYSTEM FOR INDIVIDUAL PERIPHERAL DEVICE

CROSS-REFERENCE TO RELATED APPLICATIONS

This application claims priority under 35 U.S.C. § 119(a) on Taiwan Patent Application No(s). TW110149663, filed in on Dec. 30, 2021, and is a Continuation-In-Part application of U.S. application Ser. No. 17/737,856 filed on May 5, 2022, now U.S. Pat. No. 11,599,137 B2, which claims priority under 35 U.S.C. § 119(a) on Taiwan Patent Application No. TW110148204, filed on Dec. 22, 2021, and claims the priority of U.S. Patent Application No. 63/184,553, filed on May 5, 2021, the entire contents of which are hereby incorporated by reference.

BACKGROUND

1. Technical Field

This disclosure relates to a cloud system for an individual peripheral device.

2. Related Art

With the rapid development of technology, the performance of computers and peripheral devices is increases day by day, and the interaction between users and computers is getting closer and closer. Users can use many peripheral devices to interact with computers, such as mice and touch screens.

Therefore, rather than simply focusing on the performance of peripheral devices, user's experience and presence have become an important factor. How to use peripheral devices to enhance the user's experience and presence has become an important issue. For example, the operation status of the peripheral device may need to be calibrated after the peripheral device is used by the user. However, the current calibration method techniques may not be efficient, and sometimes the components in the peripheral device even need to be replaced.

SUMMARY

Accordingly, this disclosure provides a cloud system for an individual peripheral device.

According to one or more embodiment of this disclosure, a cloud system includes: an individual peripheral device including a microcontroller and a memory electrically connected to the microcontroller, wherein the microcontroller collects input-output data of the individual peripheral device, and the memory stores product data of the individual peripheral device, user data of the individual peripheral device and the input-output data; a local host device electrically connected to the individual peripheral device, configured to receive the product data, the user data and the input-output data, wherein the local host device collects environment data of the individual peripheral device; and a cloud unit communicatively connected to the local host device, configured to receive the product data, the user data, the input-output data and the environment data and status data of the local host device, and output an effective parameter according to the input-output data, the environment data and the status data, wherein the cloud unit transmits the effective parameter to the individual peripheral device through the local host device for correcting the input-output data.

In view of the above description, the cloud system according to one or more embodiments of the present disclosure may efficiently calibrate the operation status of the individual peripheral device. Further, by performing a part of computation at the microcontroller of the individual peripheral device, transmission speed and data volume between data transmission form the individual peripheral device to the local host device, cloud unit and even the service provider may be reduced.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present invention. The following embodiments further illustrate various aspects of the present invention, but are not meant to limit the scope of the present invention.

Figure 1:
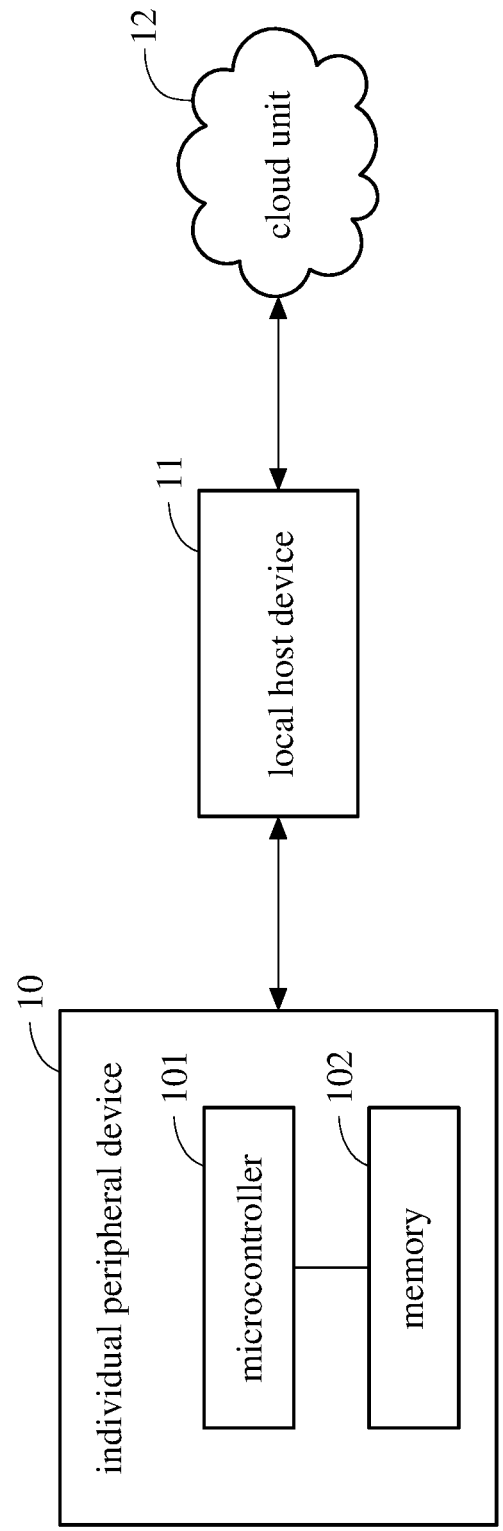
FIG. 1 is a block diagram illustrating a cloud system according to an embodiment of the present disclosure.

Please refer to FIG. 1, wherein FIG. 1 is a block diagram illustrating a cloud system according to an embodiment of the present disclosure. The cloud system 1 according to an embodiment of the present disclosure includes an individual peripheral device 10, a local host device 11 and a cloud unit 12. The individual peripheral device 10 is electrically connected to the local host device 11, and the local host device 11 is communicatively connected to the cloud unit 12.

The individual peripheral device 10 may be a keyboard, a mouse, a joystick, a stylus, a headset, a speaker, a camera, a panel, a printer and a wearable device (smart watch, smart glasses) etc. The individual peripheral device 10 includes a microcontroller 101 and a memory 102 electrically connected to the microcontroller 101. The microcontroller 101 may include one or more of a central processing unit (CPU) and/or a complex programmable logic device (CPLD) etc., the present disclosure is not limited thereto. The memory 102 may be a non-volatile memory (NVM), such as a read-only memory (ROM), a flash memory, a non-volatile random access memory (NVRAM), a hard disk (HDD) a solid state disk (SSD) etc., the present disclosure is not limited thereto. FIG. 1 shows the memory 102 disposed in individual peripheral device 10, but the memory 102 may also be a built-in memory of the local host device 11.

The local host device 11 may be a personal computer, a mobile device, a local server, a router, and Internet node, and a WiFi station etc. The local host device 11 is a device that can receive a user command through the individual peripheral device 10. The cloud unit 12 may be a cloud server and/or a data center of a manufacturer (brand), an original equipment manufacturer (OEM), an original design manufacture (ODM) etc. of the individual peripheral device 10.

Specifically, the microcontroller 101 collects input-output data of the individual peripheral device 10, and the memory 102 stores product data of the individual peripheral device 10, user data of the individual peripheral device 10 and the input-output data.

The input-output data may include a user command that is inputted to the individual peripheral device 10 by the user. For example, the input-output data may be a number or an alphabet received through the individual peripheral device 10, the input-output data may also be a location of the cursor and/or a click received through the individual peripheral device 10. The product data may include a USB vendor ID (VID), product ID (PID), media access control (MAC) address of the individual peripheral device 10. The user data may be user ID or account of local host device, login information etc. In an example where the individual peripheral device 10 is a keyboard, a number of sensors may be disposed under the keys, respectively. The sensors may include, but not limited to, pressure sensors, counters, etc. The sensors may be electrically connected to the microcontroller 101 and the memory 102. Therefore, the sensors may be used to sense the user's typing force, typing frequency on a certain key to generate sensing data, and the sensing data may be stored in the memory 102. Further, based on the sensing data, the individual peripheral device 10 may determine one or more keys that are often used by the user.

The local host device 11 is configured to receive the product data, the user data and the input-output data from the individual peripheral device 10, wherein the local host device 11 collects environment data of the individual peripheral device 10. The environment data may include data GPS location of the individual peripheral device 10, local time, temperature data, humidity data, UV index, wind speed, etc. at the individual peripheral device 10 side. The local host device 11 outputs the product data, the user data, the input-output data and the environment data to the cloud unit 12. That is, the local host device 11 may act as a relay station between the individual peripheral device 10 and the cloud unit 12.

The cloud unit 12 receives the product data, the user data, the input-output data and the environment data and status data of the local host device 11. The status data may indicate the operation status of the local host device 11, such as clock rate of a processor of the local host device 11, Internet connection status, and memory capacity etc. The cloud unit 12 outputs an effective parameter according to the input-output data, the environment data and the status data, wherein the cloud unit 12 transmits the effective parameter to the individual peripheral device 10 through the local host device 11 for correcting the input-output data.

After receiving the input-output data, the environment data and the status data of the local host device 11, the cloud unit 12 may determine the effective parameter according to the input-output data, the environment data and the status data, wherein the local host device 11 may operate according to the effective parameter, or the local host device 11 may instruct the individual peripheral device 10 to operate according to the effective parameter. That is, the effective parameter may be used to modify the status data.

For example, assuming the individual peripheral device 10 is a joystick and the cloud unit 12 is a cloud server of an online game, and the individual peripheral device 10 is used to control a movement of a character in the online game. In this case, the input-output data may include the movement of the character, the environment data may include the GPS location of the individual peripheral device 10 and the status data may include the Internet connection status between the local host device 11 and the cloud unit 12. Based on the input-output data, the cloud unit 12 may determine the movement pattern and position of the character, and based on the environment data and the status data, the cloud unit 12 may determine that the Internet connection at the local host device 11 side is slower than average, causing the movement of the character to be lagging. Therefore, the cloud unit 12 transmits the effective parameter including parameters for adjusting the movement (the input-output data) of the character to the individual peripheral device 10, thereby correcting the position of the character to the intended position.

In another example, the microcontroller 101 of the individual peripheral device 10 receives the effective parameter, and controls operation of one or more elements within the individual peripheral device 10 accordingly. Further, the microcontroller 101 may correct the status data of the local host device 11 according to the effective parameter.

The cloud unit 12 may perform analysis and/or statistic on the input-output data, to determine if a certain part of the individual peripheral device 10 is malfunctioning, and may return a correction signal back to the local host device 11. For example, assuming the individual peripheral device 10 is a keyboard, and the cloud unit 12 determines that the key "P" of the individual peripheral device 10 receives higher pressure than other keys based on the input-output data, then the cloud unit 12 may return a correction signal in the form of a notification back to the local host device 11 based on the product data, to notify the user of the individual peripheral device 10 to check or replace the key "P".

Further, assuming the cloud unit 12 is connected to a number of local host devices 11, with each local host device 11 connected to a corresponding individual peripheral device 10, and the cloud unit 12 determines that the key "P" of multiple local host devices 11 receive higher pressure than other keys based on the input-output data of the local host devices 11, then the cloud unit 12 may return a correction signal in the form of a notification back to said multiple local host devices 11 based on the product data, to notify the users of the individual peripheral devices 10 to check or replace the key "P".

In addition, the cloud unit 12 may perform analysis and/or statistic on the environment data, to determine if the individual peripheral device 10 requires maintenance, and may return a correction signal back to the local host device 11. For example, assuming the environment data includes temperature data and humidity data around the individual peripheral device 10, the cloud unit 12 may determine that the individual peripheral device 10 requires maintenance due to constant high temperature and high humidity. Then, the cloud unit 12 may return a correction signal in the form of a notification back to the local host device 11 based on the product data, to notify the user of the individual peripheral device 10 to check the individual peripheral device 10.

Figure 2:
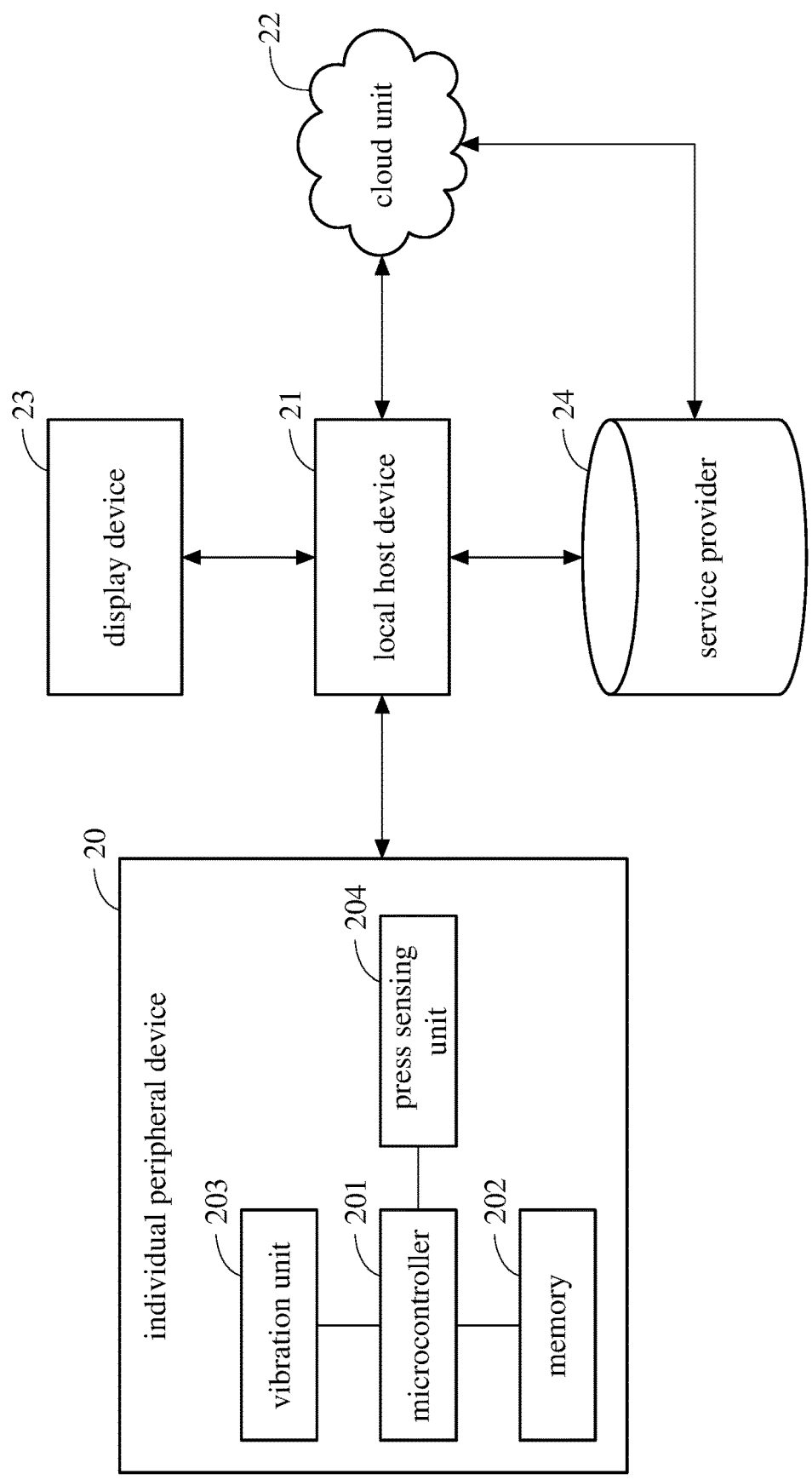
FIG. 2 is a block diagram illustrating a cloud system according to another embodiment of the present disclosure.
Figure 3:
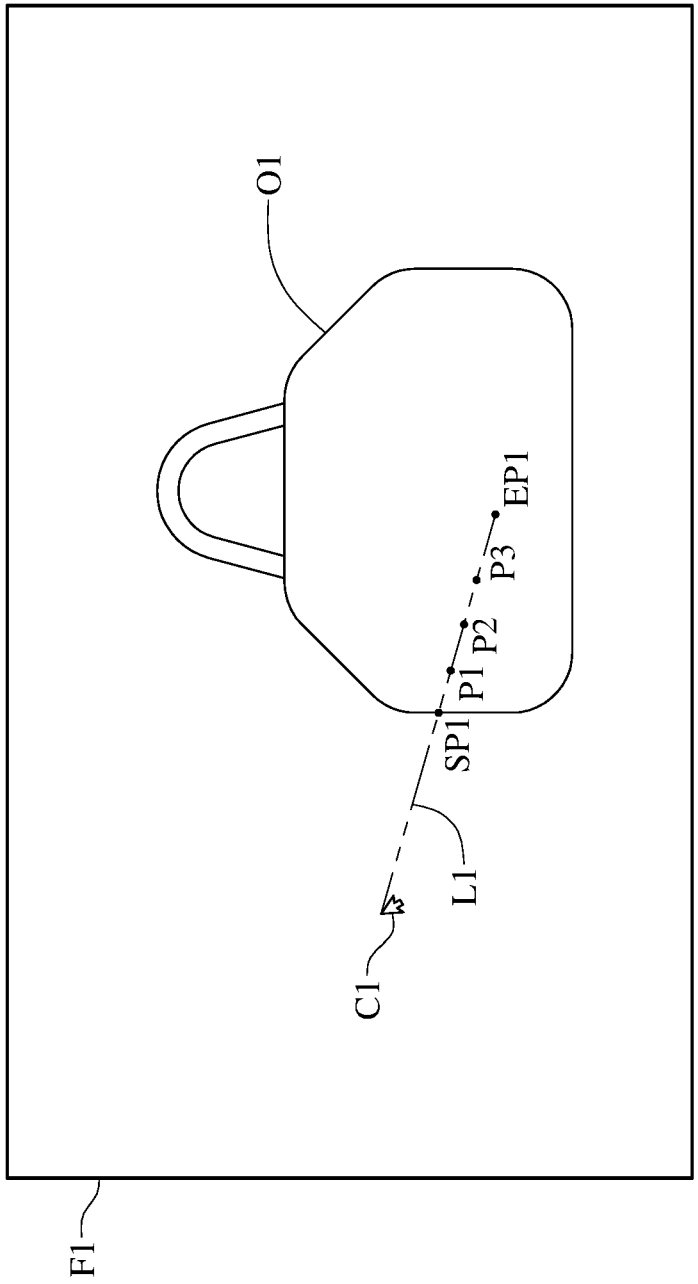
FIG. 3 is a schematic diagram of the application of the cloud system according to an embodiment of the present disclosure.

Please refer to FIG. 2 and FIG. 3, wherein FIG. 2 is a block diagram illustrating a cloud system according to another embodiment of the present disclosure, and FIG. 3 is a schematic diagram of the application of the cloud system according to an embodiment of the present disclosure. The cloud system 2 of FIG. 2 includes an individual peripheral device 20, a local host device 21, a cloud unit 22, a display device 23 and service provider 24. The local host device 21 and the cloud unit 22 of FIG. 2 may be the same as that of FIG. 1, their repeated descriptions thereof are omitted herein.

The individual peripheral device 20 includes a microcontroller 201, a memory 202, a vibration unit 203 and a press sensing unit 204. The microcontroller 201 is electrically connected to the memory 202, the vibration unit 203 and the press sensing unit 204, wherein the microcontroller 201 and the memory 202 may be the same as that of FIG. 1, their repeated descriptions thereof are omitted herein. The microcontroller 201, the memory 202, the vibration unit 203 and the press sensing unit 204 may be directly connected to the local host device 21, or the memory 202, the vibration unit 203 and the press sensing unit 204 may be directly connected to the local host device 21 through the microcontroller 201.

The vibration unit 203 is, for example, a micro-vibrator, and may be controlled by the local host device to vibrate. The press sensing unit 204 is, for example, a pressure sensor or other types of stress sensor, and is configured to sense the press provided by a user to generate and transmit sensing signal to the local host device 21.

The display device 23 is electrically connected to or communicatively connected to the local host device 21. The display device 23 is configured to present a display image F1 and a cursor C1 for the user to see. The display device 23 may be, for example, a light emitting diode display device or an organic light emitting diode display device or any other types of display device. In an embodiment, the individual peripheral device 20, the local host device 21 and the display device 23 may be integrated as a touch display panel.

The service provider 24 is communicatively connected to the local host device 21 and the cloud unit 22. The service provider 24 may be a server disposed at the edge end for providing a gaming platform, a telecommunications provider (TSP), an application service provider (ASP), a storage service provider (SSP), an Internet service provider (ISP), a network service provider (NSP) and a communications service provider (CSP) etc. For example, in a situation where the user of the individual peripheral device 20 and the local host device 21 locates at country A, and the cloud unit 22 is a cloud unit of a manufacturer of an online game locating at country B. Then, the service provider 24 may be a relay server for relaying the online game to the user.

The individual peripheral device 20 may generate a movement signal and transmits the movement signal to the local host device 21 and/or the cloud unit 22. In an embodiment, the individual peripheral device 20 is a mouse, and the mouse may generate the movement signal when moved by the user. In another embodiment, the individual peripheral device 20 is a touch pad, and the touch pad may generate the movement signal when a user touch and move his/her finger on the touch pad.

As described above, the local host device 21 may be disposed at the user end, and the cloud unit 22 may be disposed at the cloud end or at edge end. Further, the local host device 21 may provide the display image F1 including an object O1 as shown in FIG. 3. The display image F1 may be pre-stored in the local host device 21; or, the display image F1 may be an image corresponding to the webpage obtained by the local host device 21 connected to the Internet. Moreover, the feature data is obtained by the cloud unit 22 through Wifi connection to the service provider 24, or obtained by the service provider 24 through its internal database.

The local host device 21 builds a cursor C1 corresponding to the individual peripheral device 20 on the display image F1, determines an overlap route between the cursor C1 and the object O1 according to the movement signal, and controls the vibration unit 203 to generate a vibration waveform change during a vibration period according to the overlap route and feature data of the object O1. The vibration waveform change may be included in the input-output data described above. The feature data may be pre-stored in the local host device 21; or, the feature data may be obtained by the local host device 21 by searching the Internet. In addition, the local host device 21 may further control the vibration unit 203 to generate another vibration waveform change during the vibration period according to the sensing signal of the press sensing unit 204.

Moreover, the operation of building the cursor C1 on the display image F1 and determining the overlap route may be performed by the local host device 21, and the operation of controlling the vibration unit 203 may be performed by the cloud unit 22 through the local host device 21. In addition, the operation of generating another vibration waveform change during the vibration period according to the sensing signal of the press sensing unit 204 may be performed by the local host device 21 or the cloud unit 22. In an embodiment, the above operations may be all performed by one of the local host device 21 or the cloud unit 22, and the other may be selectively disposed.

The memory 202 may further store the feature data and/or the display image F1 of the object O1. The feature data may include the appearance and touch simulation data of the object O1, and the appearance of the object O1 may include the shape of the object O1, the surface texture of the object O1, and the material of the object O1. The touch simulation data may be the effective parameter stated above. The touch simulation data includes a number of vibration parameters generated for simulating the touch sensation of the object O1. The vibration parameters may be included in the effective parameter described above. The vibration parameters correspond to different locations of the object O1 respectively, especially to coordinates of a number of points (such as pixels) composing the object O1, and may include frequency and/or amplitude. The memory may also store other feature data of other objects.

The touch simulation data indicates the detail operation the local host device 21 controlling the vibration unit 203 to generate the vibration waveform change. As shown in FIG. 3, the local host device 21 builds the cursor C1 in the display image F1 corresponding to the local host device 21. The local host device 21 predicts a moving rout L1 of the cursor C1 in the display image F1 according to the movement signal of the individual peripheral device 20, and determines the overlap rout of the moving rout L1 and the object O1, wherein the overlap route includes an overlap starting point SP1, a number of overlap route points P1-P3 and an overlap ending point EP1. The overlap starting point SP1 is a location where the moving rout L1 and the object O1 start to overlap with each other, and may locate at a boundary of one side of the object O1. The overlap ending point EP1 is a location where the moving rout L1 and the object O1 stops overlapping with each other, and may locate at the middle or another boundary of another side of the object O1.

The local host device 21 obtains the corresponding touch simulation data from the memory 202, sets a number of vibration parameters corresponding to the overlap starting point SP1, the overlap route points P1-P3 and the overlap ending point EP1 according to the touch simulation data. Specifically, the local host device 21 may extract vibration parameters corresponding to coordinates from the touch simulation data according to coordinates of the overlap starting point SP1, the overlap route points P1-P3 and the overlap ending point EP1. Based on the moving speed of the cursor C1, the local host device 21 may also predict a time point of the cursor C1 arrives at the overlap starting point SP1 and a time point of the cursor C1 arrives at the overlap ending point EP1, and using a duration between the two time points as the vibration period, or may use the two time points as the starting time point and the ending time point of the vibration period respectively. The local host device 21 controls the vibration unit 203 to vibrate during the vibration period to generate the vibration waveform change according to the vibration parameters, wherein the vibration parameters may include frequency variation and/or amplitude variation.

In another embodiment, in addition to the vibration waveform change (referred to as "first vibration waveform change") generated according to the movement signal, the local host device 21 may further control the vibration unit 203 to generate a second vibration waveform change during the vibration period according to the sensing signal of the generated by the press sensing unit 204 corresponding to the user's push/press. The first vibration waveform change and the second vibration waveform change may each include a frequency variation and/or amplitude variation. The first vibration waveform change is used to simulates the touch sensation of the object O1, and the second vibration waveform change is used to enhance simulation of the touch sensation of the object O1 according to the strength of the user pressing the individual peripheral device 20. The first vibration waveform change is different from the second vibration waveform change.

In a situation of using the cloud system 2, when the user is looking at the object O1 of an online shop on the display device 23 and moving the individual peripheral device 20, the cloud system 2 may generate vibration having vibration waveform changes through controlling the individual peripheral device 20, to simulate the touch sensation of the object O1. Therefore, the user (for example, the customer) may sense the texture of the object O1, thereby enhancing the user's perception of the object O1. In another situation of using the cloud system 2, when the user is playing a game on the local host device 21 and is looking at the object O1 on the display device 23 and moving the individual peripheral device 20, the cloud system 2 may generate vibration having vibration waveform changes through controlling the individual peripheral device 20. Therefore, the user may feel immersive, which enhances the user's game presence. In addition, the cloud system 2 may also be applied to other virtual environment presented by the local host device 21 and the display device 23.

It should be noted that, the above described operation of controlling the vibration unit 203 may also be performed by the cloud unit 22, the service provider 24, or by the cloud unit 22 along with the service provider 24. That is, the cloud unit 22 may control the vibration unit 203 through the local host device 21, or through the service provider 24 and the local host device 21. For example, the service provider 24 may provide the display image F1, determine the overlap route between the cursor C1 and the object O1 according to the movement signal, and controls the vibration unit 203 to generate the vibration waveform change during the vibration period according to the overlap route and the feature data of the object O1. Further, the service provider 24 may set and obtain the vibration parameter of each of the overlap starting point SP1, the overlap route points P1-P3 and the overlap ending point EP1, and control the vibration unit 203 according to each vibration parameter of the overlap starting point SP1, the overlap route points P1-P3 and the overlap ending point EP1.

In addition to the embodiments described above, the service provider 24 is configured to receive the product data, the user data, the status data and the effective parameter from the cloud unit 12. The service provider 24 is further configured to redistribute a resource of the service provider 24 according to at least one of the product data, the user data, the status data or the effective parameter from the cloud unit 22. For example, based on the product data and the status data, the service provider 24 may determine that, among product A to product Z, product A has poorer Internet connection. Therefore, the service provider 24 may redistribute the Internet connection between product A to product Z, to improve the Internet connection on product A side. For another example, based on the user data and the status data, the service provider 24 may determine that, among a number of individual peripheral devices of a number of users, the individual peripheral device 10 has poorer Internet connection. Therefore, the service provider 24 may redistribute the Internet connection between the individual peripheral devices based on the corresponding user data, to improve the Internet connection on the individual peripheral device 10 side.

In addition to the embodiments described above, the service provider 24 is configured to output correction data according to at least one of the product data, the user data, the status data or the effective parameter from the cloud unit 22, and transmit the correction data to the local host device 21 for modifying the status data.

In addition to the embodiments described above, the service provider 24 may output correction data according to at least one of the product data, the user data, the status data or the effective parameter from the cloud unit 22, and transmit the correction data to the individual peripheral device 20 through the local host device 21 for modifying the input-output data. For example, the correction data may be data associated with the vibration of the vibration unit 203 to modify the vibration parameter of the input-output data.

For example, the individual peripheral device 20 may generate the calibration data, and uploads the calibration data to the cloud unit 22. The calibration data may be zeroing information or virtual true circle etc. of a joystick, wherein the zeroing information may represent the voltage output of the sensor used to sense the movement of the joystick when the joystick is not under force, and the virtual true circle may represent the voltage output of the sensor on which the joystick is moved when the joystick is moved to the limit. The individual peripheral device 20 may also upload the product data, the user data of the owner of the individual peripheral device 20, and/or the current status data.

In an example, the service provider 24 may obtain the calibration data and the product data of a number of individual peripheral devices, analyze the calibration data and the product data to determine the correction data suitable for correcting input/output of individual peripheral devices with the same model (for example, the same PID or the same VID), and transmit the correction data to the individual peripheral devices with the same model. In another example, the service provider 24 may obtain the calibration data and the user data of the owner of a number of individual peripheral devices from the cloud unit 22, analyze the calibration data and the product data to determine the correction data suitable for correcting input/output of individual peripheral devices of the same user, and transmit the correction data to the individual peripheral devices of the same user. In yet another example, the service provider 24 may obtain the calibration data and the status data of the operation of the individual peripheral device 20, analyze the calibration data and the status data to determine the correction data suitable for correcting input/output of the individual peripheral device 20 under some specific circumstances (for example, when the battery of the individual peripheral device 20 is running low etc.), and transmit the correction data to the individual peripheral device 20.

Figure 4:
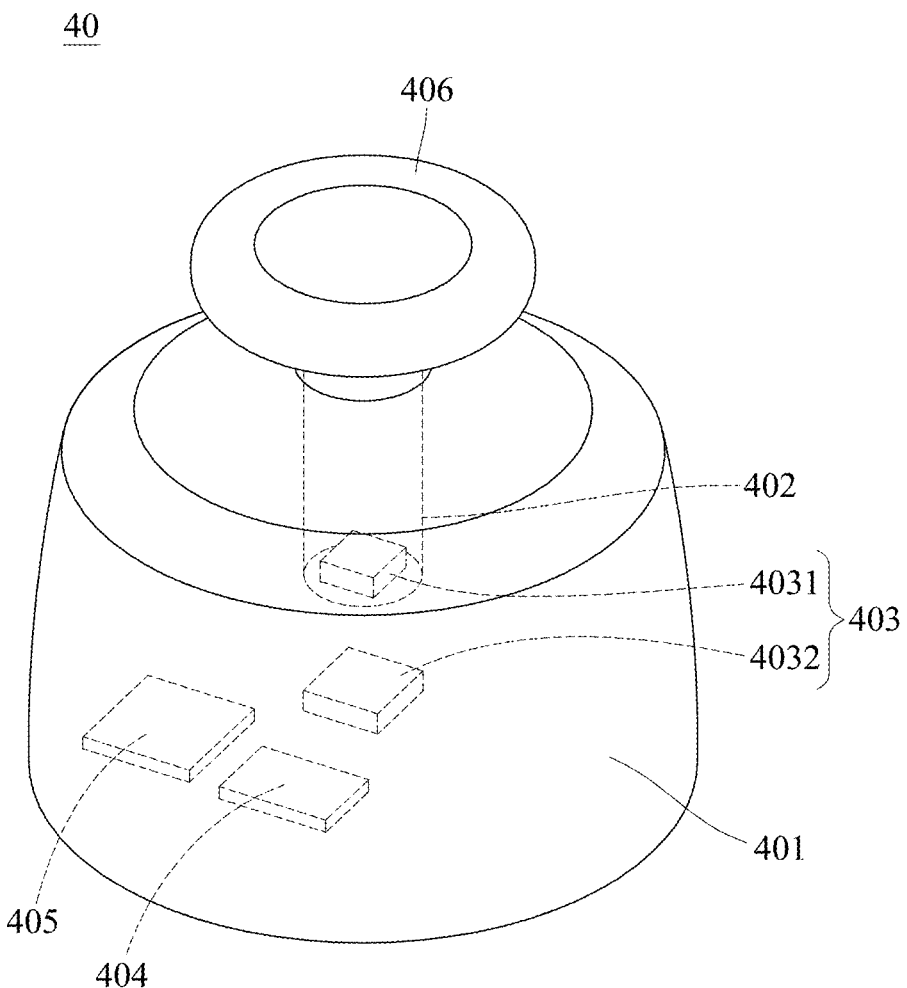
FIG. 4 is a schematic diagram of a joystick assembly according to an embodiment of the present disclosure.

Please refer to FIG. 4, wherein FIG. 4 is a schematic diagram of a joystick assembly according to an embodiment of the present disclosure. The individual peripheral device 10 of FIG. 1 and the individual peripheral device 20 of FIG. 2 may be a joystick assembly 40 as shown in FIG. 4.

The joystick assembly 40 includes a base 401, a shaft 402, a movement sensing unit 403, a memory 404 and a microcontroller 405. The shaft 402 is pivotally disposed at the base 401 and a joystick cap 406 may be installed on the shaft 402. It should be noted that FIG. 4 exemplarily illustrates the shapes of the base 401 and the joystick cap 406 of the joystick assembly 40 instead of intending to limit the present disclosure. The memory 404 and the microcontroller 405 of FIG. 4 may be the same as that of FIG. 1.

The movement sensing unit 403 is disposed in the base 401 and is configured to sense the movement of the shaft 402 relative to the base 401 to generate the movement signal. The movement sensing unit 403 includes one or more magnetic components 4031 and a Hall integrated circuit 4032. The magnetic component 4031 may be implemented by a magnet or the other magnetic material and is disposed on one terminal, located in the base 401, of the shaft 402. The Hall integrated circuit 4032 may be disposed in the base 401 and is configured to sense the movement of the magnetic component 4031 as the shaft 402 moves relative to the base 401 to generate a movement signal. Specifically, the Hall integrated circuit 4032 may include Hall effect sensors and a signal processing circuit, the said Hall effect sensors may respectively detect magnetic field sensing signals, and the signal processing circuit may process the said magnetic field sensing signals to generate digital signals corresponding to the movements on the x-axis and the y-axis as the said movement signal.

In another embodiment, the movement sensing unit 403 may include at least two potentiometers. The said at least two potentiometers output voltage values corresponding to the movements on the x-axis and the y-axis respectively following the movement of the shaft 402 relative to the base 401, wherein the voltage values are served as the movement signal.

The memory 404 is disposed in the base 401. The memory 104 may store an identification number (for example, the product data) of the joystick assembly and a number of pieces of calibration data. The identification number of the joystick assembly may indicate a production batch number of the joystick assembly 40. The calibration data may include a static signal and a virtual true circle, and wherein the static signal indicates a signal (such as a voltage value, a current value, etc.) detected by the movement sensing unit 403 when the shaft 402 is not moved by any external force and the virtual true circle indicates a movement range of the shaft 402 with respect to the base 401. Besides, the memory 404 may be electrically coupled to the movement sensing unit 403 and may store the signal detected by the movement sensing unit 403.

Specifically, the memory 404 may further output one or more of the identification numbers of the joystick assembly, the pieces of calibration data and the signal detected by the movement sensing unit 403 for a computing device to perform collecting, tracking, analysis on the data of the joystick assembly 40, wherein the computing device may be the local host device, the microcontroller 405, the cloud unit, the service provider or an external processing device. In particular, the computing device may read the identification numbers and the pieces of calibration data of multiple joystick assemblies and accordingly perform analysis on the calibration data of joystick assemblies that belong to the same production batch number or comparing the calibration data of joystick assemblies with different production batch numbers and so on. For example, the computing device may utilize the calibration data of all the joystick assemblies with the same identification number to analyze a yield rate of these joystick assemblies produced in the same production batch.

The microcontroller 405 is disposed in the base 401 and is electrically coupled to the movement sensing unit 403 and the memory 404. The microcontroller 405 and the aforementioned memory 404 may be included in an integrated circuit. The microcontroller 405 is configured to determine whether to output the movement signal according to the pieces of calibration data. Specifically, the calibration data may include the static signal and the virtual true circle, and the microcontroller 405 may utilize the static signal and the virtual true circle to obtain 2D coordinates and may determine whether the 2D coordinates are in the virtual true circle. The microcontroller 405 outputs the movement signal when the 2D coordinates are in the virtual true circle. The microcontroller 405 does not output the movement signal when the 2D coordinates are not in the virtual true circle. The 2D coordinates and the virtual true circle belong to the same coordinate system. The data contents indicated by the 2D coordinates and the virtual true circle are the same as those described above. By regarding the virtual true circle as a calibration indicator, there is no need to particularly design a structure according to a sensing range of the movement sensing unit 403 of the joystick assembly 40 to limit a moving range of the shaft 402, and cost of the structure design is lowered.

In particular, the Hall integrated circuit 4032, the memory 404 and the microcontroller 405 of the said movement sensing unit 403 may be disposed on one circuit board.

In one embodiment, the movement sensing unit 403 is further configured to generate the static signal associated with the shaft 402, a horizontal movement limit signal and a vertical movement limit signal in addition to performing the operation of the aforementioned embodiment. The static signal indicates the signal detected by the movement sensing unit 403 when the shaft 402 is not moved by any external force. The horizontal movement limit signal indicates the signal detected by the movement sensing unit 403 when the shaft 402 is moved to the limit on the horizontal direction. The vertical movement limit signal indicates the signal detected by the movement sensing unit 403 when the shaft 402 is moved to the limit on the vertical direction. In addition to the operation of the aforementioned embodiment, the microcontroller 405 is further configured to perform zero calibration operation according to the static signal, and to perform virtual true circle calibration operation according to the static signal associated with the shaft 402, the horizontal movement limit signal and the vertical movement limit signal, and to store a result of the virtual true circle calibration operation and the static signal into the memory 404 as the pieces of calibration data.

Specifically, the zero calibration operation performed by the microcontroller 405 includes regarding the 2D coordinates corresponding to the static signal as the coordinates of the center. The virtual true circle calibration operation performed by the microcontroller 405 includes: utilizing the static signal and the horizontal movement limit signal to obtain an x-coordinate; utilizing the static signal and the vertical movement limit signal to obtain a y-coordinate; transforming the x-coordinate and the y-coordinate into polar coordinates to obtain a radius; utilizing the radius and the aforementioned coordinates of the center to obtain the virtual true circle as the result of the virtual true circle calibration operation which is one of the pieces of calibration data. The movement of the aforementioned shaft 402 may be manipulated by a user or a mechanical arm of a testing apparatus and the microcontroller 405 may be triggered by the user or the testing apparatus to perform the aforementioned calibration operation.

In particular, the piece of calibration data may be obtained by the operation of the movement sensing unit 403 and the microcontroller 405 before the joystick assembly 40 is out of the factory. Or, the joystick assembly 40 may update the calibration data by performing the aforementioned operation of the movement sensing unit 403 and the microcontroller 405 again.

Figure 5:
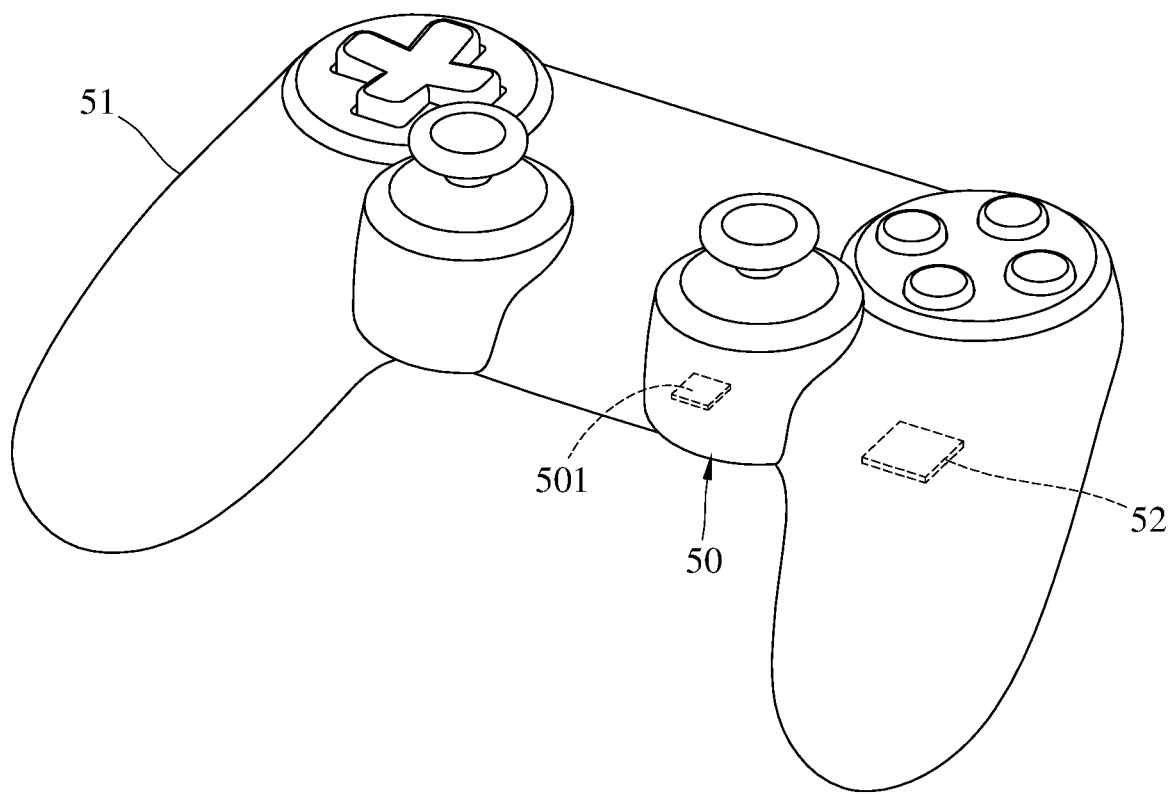
FIG. 5 is a schematic diagram of a game controller according to an embodiment of the present disclosure.

Please refer to FIG. 5, which is a schematic diagram of a game controller according to one embodiment of the present disclosure. As illustrated in FIG. 5, the game controller 500 may include a body 51 and one or more joystick assemblies 50, wherein each joystick assembly 50 may be pluggably disposed at the body 51 and may be the joystick assembly 40 described in FIG. 4. Specifically, the game controller 500 may further include a processing device 52. The processing device 52 is disposed in the body 51 and may be coupled to the microcontroller 501 by wire connection or wireless connection. The processing device 52 may be disposed in a region other than the region where the joystick assembly 50 is disposed in the body 51. The processing device 52 may be disposed on a circuit board different from the circuit board where the microcontroller 501 is disposed. The processing device 52 may be implemented by another microcontroller and is configured to receive the movement signal determined to be output by the microcontroller 501 according to the pieces of calibration data. The processing device 52 may perform signal processing on the movement signal or combine the movement signal and a control signal from another control assembly such as a circle button, a D-pad etc. of the game controller 500 for analysis and/or processing, but the present disclosure is not limited thereto.

By the aforementioned structure, for the joystick assembly and the game controller disclosed by the present disclosure, the joystick assembly itself is provided with the memory and the microcontroller, wherein the memory stores the identification number of the joystick assembly for data collecting, data tracking, data analysis and etc. In addition, the memory of the joystick assembly stores the pieces of calibration data for the microcontroller to determine whether to output an input signal. In other words, the joystick assembly may complete the calibration before the joystick assembly is out of the factory or before it is installed in the game controller so as to avoid the problem of checking the components one by one when the signal of the equipment is not as expected.

In view of the above description, the cloud system according to one or more embodiments of the present disclosure may efficiently calibrate the operation status of the individual peripheral device. Further, by performing a part of computation at the microcontroller of the individual peripheral device, transmission speed and data volume between data transmission form the individual peripheral device to the local host device, cloud unit and even the service provider may be reduced.

What is claimed is:

1. A cloud system, comprising:
an individual peripheral device comprising a microcontroller and a memory electrically connected to the microcontroller, wherein the microcontroller collects input-output data of the individual peripheral device, and the memory stores product data of the individual peripheral device, user data of the individual peripheral device and the input-output data;
a local host device electrically connected to the individual peripheral device, configured to receive the product data, the user data and the input-output data, wherein the local host device collects environment data of the individual peripheral device; and
a cloud unit communicatively connected to the local host device, configured to receive the product data, the user data, the input-output data and the environment data and status data of the local host device, and output an effective parameter according to the input-output data, the environment data and the status data,
wherein the cloud unit transmits the effective parameter to the individual peripheral device through the local host device for correcting the input-output data.

2. The cloud system according to claim 1, wherein the microcontroller corrects the status data of the local host device according to the effective parameter.

3. The cloud system according to claim 1, further comprising a service provider communicatively connected to the local host device and the cloud unit, configured to receive the product data, the user data, the status data and the effective parameter from the cloud unit.

4. The cloud system according to claim 3, wherein the individual peripheral device further comprises a vibration unit and further generates a movement signal,
wherein the service provider is further configured to provide a display image of an object, create a cursor corresponding to the individual peripheral device at the display image, determine an overlap route between the cursor and the object according to the movement signal, and control the vibration unit to generate a vibration waveform change during a vibration period according to the overlap route and feature data of the object.

5. The cloud system according to claim 4, wherein the effective parameter comprises a vibration parameter, and the overlap route comprises a plurality of overlap route points, the feature data comprises touch simulation data, the service provider sets and obtains the vibration parameter of each one of the overlap route points, and controls the vibration unit according to each one of the vibration parameters of the overlap route points.

6. The cloud system according to claim 3, wherein the service provider is configured to redistribute a resource of the service provider according to at least one of the product data, the user data, the status data or the effective parameter from the cloud unit.

7. The cloud system according to claim 3, wherein the service provider is configured to output correction data according to at least one of the product data, the user data, the status data or the effective parameter from the cloud unit, transmit the correction data to the local host device for modifying the status data.

8. The cloud system according to claim 3, wherein the service provider outputs a correction data according to at least one of the product data, the user data, the status data or the effective parameter from the cloud unit, transmit the correction data to the individual peripheral device through the local host device for modifying the input-output data.

9. The cloud system according to claim 1, wherein the individual peripheral device comprises a vibration unit and further generates a movement signal,
wherein the local host device is disposed at a user end, and the cloud unit is disposed at an edge end, the local host device or the cloud unit is further configured to provide a display image of an object, the local host device is further configured to create a cursor corresponding to the individual peripheral device at the display image and determine an overlap route between the cursor and the object according to the movement signal, and the cloud unit is further configured to control the vibration unit to generate a vibration waveform change during a vibration period according to the overlap route and feature data of the object.

10. The cloud system according to claim 9, wherein the effective parameter comprises a vibration parameter, and the overlap route comprises a plurality of overlap route points, the feature data comprises touch simulation data, the cloud unit sets and obtains the vibration parameter of each one of the overlap route points, and controls the vibration unit according to each one of the vibration parameters of the overlap route points.

11. The cloud system according to claim 9, wherein the overlap route points comprise an overlap starting point and an overlap ending point, and the cloud unit sets the vibration period according to the overlap starting point and the overlap ending point.

12. The cloud system according to claim 9, wherein the individual peripheral device further comprises a press sensing unit, the press sensing unit is configured to sense a pressing to generate and transmit a sensing signal to the local host device or the cloud unit, and the local host device or the cloud unit is configured to control the vibration unit to generate another vibration waveform change during the vibration period according to the sensing signal.

13. The cloud system according to claim 1, wherein the individual peripheral device is a joystick assembly, and further comprises:
a base;
a shaft pivotally disposed at the base; and
a movement sensing unit disposed in the base and configured to sense a movement of the shaft relative to the base to generate a movement signal,
wherein the memory is disposed in the base and further stores an identification number of the joystick assembly and a plurality of pieces of calibration data, and
wherein the microcontroller is disposed in the base, electrically coupled to the movement sensing unit, and configured to determine whether to output the movement signal according to the plurality of pieces of calibration data.

14. The cloud system according to claim 13, wherein the movement sensing unit comprises:
a magnetic component disposed on one terminal, located in the base, of the shaft; and
a Hall integrated circuit disposed in the base and configured to sense a movement of the magnetic component as the shaft moves relative to the base to generate a digital signal, wherein the digital signal serves as the movement signal.

15. The cloud system according to claim 13, wherein the plurality of pieces of calibration data comprise a virtual true circle and a static signal and determining whether to output the movement signal according to the plurality of pieces of calibration data performed by the microcontroller comprises:
utilizing the static signal and the movement signal to obtain 2D coordinates;
determining whether the 2D coordinates are in the virtual true circle or not;
outputting the movement signal if the 2D coordinates are in the virtual true circle; and
not outputting the movement signal if the 2D coordinates are not in the virtual true circle.

16. The cloud system according to claim 13, wherein the movement sensing unit is further configured to generate a static signal associated with the shaft, a horizontal movement limit signal and a vertical movement limit signal, the microcontroller is further configured to perform a calibration operation according to the static signal, the horizontal movement limit signal and the vertical movement limit signal and store a result of the calibration operation and the static signal into the memory as the plurality of pieces of calibration data.

17. The cloud system according to claim 16, wherein performing the calibration operation performed by the microcontroller comprises:
utilizing the static signal and the horizontal movement limit signal to obtain an x-coordinate;
utilizing the static signal and the vertical movement limit signal to obtain a y-coordinate; and
transforming the x-coordinate and the y-coordinate into polar coordinates to obtain a virtual true circle serving as the result of the calibration operation.

18. The cloud system according to claim 16, wherein the memory is further configured to be controlled to output one or more of the identification number of the joystick assembly and the plurality of pieces of calibration data.

19. The cloud system according to claim 13 further comprising a game controller, wherein the game controller comprises the joystick assembly and a body, and the joystick assembly is pluggably disposed at the body.

20. The cloud system according to claim 19, wherein the game controller further comprises:
a processing device disposed in the body and coupled to the microcontroller, and configured to receive the movement signal determined to be output by the microcontroller according to the plurality of pieces of calibration data.

* * * * *